3,481,891
ALKYD RESINS AND ALKYD RESIN FLEXO-
GRAPHIC COATING COMPOSITIONS
Jack B. Boylan and Gene K. Shanafelt, Cincinnati, Ohio,
assignors to Emery Industries, Inc., Cincinnati, Ohio,
a corporation of Ohio
No Drawing. Filed July 20, 1966, Ser. No. 566,458
Int. Cl. C08g 17/04; C09d 11/10
U.S. Cl. 260—21
12 Claims

ABSTRACT OF THE DISCLOSURE

This invention is concerned with alkyd resins and alkyd resin flexographic coating compositions prepared from the reaction of a polymerized ethylenically unsaturated aliphatic monocarboxylic acid having between 14 and 22 carbon atoms, an aromatic or aliphatic dibasic acid or anhydride such as a phthalic acid, phthalic anhydride, maleic acid, fumaric acid and adipic acid, preferably a small amount of a monomeric acid, and a polyhydric alcohol, not more than about 60% by weight of which may be in the glycol form and which is capable of imparting to the polyester product a hydroxyl value of not less than 100 and not more than 300. The alkyd resins of this invention have particular utility in thermosetting paper overprint varnishes, which may be cast as protective and decorative coatings over printed flexible substrates, and in flexographic ink vehicles.

BACKGROUND OF THE INVENTION

This invention pertains to alkyd resins and more particularly to alkyd resin flexographic coating and flexographic ink carrier compositions. The preparation of alkyd resins from dibasic acids or anhydrides and polybasic alcohols and their use in coatings for metals, woods, paper, textiles and as adhesives in printing inks is well known. Alkyd resins in which a dimer acid is used as a base material along with dibasic acids such as phthalic acid or anhydrides and polyhydric alcohols are also known to the art; however, the dimer based alkyd resins of the past, largely because of their insolubility or lack of reducibility in alcohol have not been satisfactory for flexographic applications, either as coating compositions, or as printing ink vehicles. In the alkyd resins of the present invention, this problem has been overcome inasmuch as there resins may be alcohol reduced with such alcohols as ethanol, n-propanol, isopropanol, and other common alcohols used as solvents, thus enabling their effective use in flexographic applications.

By far the most popular method for applying coating compositions or flexographic inks to flexible substrates is the use of rubber or elastomeric rollers and plates. The rubber rollers which are used are susceptible to attack by the commonly used solvents for alkyd resins such as esters, ketones, and many hydrocarbons; whereas alcohols do not attack the rubber coating and printing equipment and thus it is preferable whenever possible to use an alcohol, preferably isopropanol or ethanol, as the solvent. Complete alcohol solubility of the ink or resin binder permits reduction or "let-down" on the press location and press clean-up with no danger of precipitating the resins in the system. Ethanol and isopropanol are particularly desirable solvents for use with flexographic inks not only because they do not attack rubber, but also because they are quickly volatilized at relatively low temperatures once the ink is in place on the substrate. Isobutanol and normal propanol are also effective solvents but are less desirable as printing ink solvents because of their higher boiling points and consequent lower volatility.

The polyester resins of the present invention, which have a hydroxyl value of at least 100 but not above the maximum value of 300, are completely reducible in alcohols such as ethanol, propanol, and n-propanol. Heretofore, polyesters having hydroxyl values in the 100–300 range have been considered abnormally high for use in aminoplast cured systems and have been generally regarded as lacking in utility so far as the flexographic film coating and printing arts are concerned. The prior thinking was to the effect that such resins would have poor cure and solvent resistance properties. Thus it was a surprising discovery that polyester resins having coating properties coupled with alcohol solubility properties possessed by those of the present invention could be prepared.

Accordingly, an object of the present invention is to provide a polyester resin which is soluble in ethanol, propanol, and isopropanol.

Another object of the present invention is to provide a new alkyd resin composition.

Another object is to provide an improved thermosetting paper overprint coating.

Another object is to provide a thermosetting coating composition having an extended pot life.

A further object of the present invention is to provide a polyester resin composition from a dimerized fatty acid, aromatic or aliphatic dibasic acids, and polyhydric alcohols.

DESCRIPTION OF THE INVENTION

The polyester resins of the present invention, as has been previously indicated, are prepared from a dimer acid, a dibasic acid or anhydride, preferably a small amount of a monomeric acid, and polyhydric alcohols, not more than about 60% by weight of which should be a diol.

The polymerized fatty acids used in the present invention are the polymerized products of ethylenically unsaturated aliphatic monocarboxylic acids having between 14 and 22 carbons and are generally referred to as dimer acids. Dimer acids are actually a mixture of monomeric acids, dimeric acids and trimeric acids with the predominant portion being dimeric. The term "dimer" as used herein is to be understood to refer to a mixture of the three acids which results from polymerization of an unsaturated aliphatic monocarboxylic acid. Many grades of dimers are available having different ratios of the three components. The dimer acid used in the present invention may include from 0–40% monomeric acid, 0–20% trimeric acid, and 60–100% dimeric acid. The use of a certain amount of monomeric acid is desirable in the preparation of the alkyd resins of this invention to operate as a chain stopper.

If the monomeric acid content in the dimer acid is sufficiently high, it alone may adequately serve as the chain stopper; however, if the monomeric acid content is low, additional monomeric acid may be used. Vegetable fatty acids, animal fatty acids, synthetic acids from petroleum sources and the like are suitable for use as the monomeric acid. The dimer acid should constitute from about 5 to about 40% by weight of the total weight of the polyester resin and preferably should be from about 15 to 30% by weight thereof.

The aromatic or aliphatic dibasic acids (or anhydrides) used as an essential component of the present invention may be one or a mixture of phthalic acids, phthalic anhydrides, maleic anhydride, fumaric acid, and adipic acid. The dibasic acid should be used in an amount of from about 30% to about 50% by weight of the total weight of the polyester resin.

The third essential ingredient in the preparation of the polyesters of the present invention is a polyhydric alcohol, preferably a triol-diol mixture. It is essential the amount and composition of the polyhydric alcohol used be such that the final polyester product will have a hydroxyl value of between 100 and 300. In order to obtain this hydroxyl value, the glycol content in percent by weight must not exceed about 60% and preferably should be from about 10 to about 50% by weight based on the total weight of polyhydric alcohol used. The glycols which may be used include ethylene glycol, propylene glycol, butylene glycol, pentanediol, hexamethylene glycol, neopentyl glycol, and various isomers of these glycols. Also, the ether glycols such as diethylene glycol, triethylene glycol and dipropylene glycol, among others, may be used. The more functional polyols containing 3, 4, or more hydroxyl groups per molecule should constitute from about 40 to about 90% of the polyol mixture used. Preferably a triol such as glycerine, trimethylolethane, trimethylol propane, or hexane triol is used, but polyols having greater functionality such as pentaerythritol, di-pentaerythritol, sorbitol and mannitol may also be employed. The polyols may be used in various combinations but as indicated earlier, the glycol or diol content must not exceed an upper limit of about 60%; otherwise, the resulting polyester will not have the hydroxyl value necessary to render it alcohol soluble.

The polyester resins of the present invention may be prepared in a number of ways including the solvent and fusion methods, both of which are conventional methods of preparation known to the art. In either of these methods, the ingredients may be added either stepwise or all together. Using either the solvent method or the fusion method, the reactants are heated at a temperature of from about 190 to about 240° C. while the water of esterification is removed. The esterification reaction is carried out until an acid value of below 40 and preferably below 10 is obtained. The esterification may be carried out in the presence of an esterification catalyst such as para toluene sulfonic acid; however, a catalyst is not required. When the solvent method is employed, a small amount of aromatic or aliphatic hydrocarbon solvent such as toluene or mineral spirits should be used in the reactor to act as a carrier. This solvent may in many instances be left in the polyester resin reaction product, but if it must be removed, the removal may be accomplished by blowing it out with an inert gas or by vacuum before reducing the polyester resin with alcohol. In order to facilitate the alcohol reduction of the final polyester resin, it is frequently desirable, particularly when the fusion method of preparation has been used, to initially reduce the hot resin with a small portion of an aliphatic hydrocarbons such as high-flash V. M. and P. naphtha, hexane, heptane, lactol spirits, high-flash mineral spirits, naphthol spirits, toluol, xylol, and other higher boiling aliphatic hydrocarbons which have a boiling point above that of the alcohol with which the resin is to be reduced. The addition of this solvent lowers the temperature of the batch and the viscosity of the resin and greatly facilitates reduction of the polyester resins with relatively more volatile alcohols. The amount of hydrocarbon solvent used to facilitate the alcohol reduction of the polyester should be not more than 30% by weight of the total solvent which is used when the polyester is reduced to about 67.5% solids content. The hydrocarbon solvent, if used in this amount, will have no undesirable effect on the end use of the polyester resins of this invention.

The present polyester resins may be reduced in a number of alcohols including ethanol, normal propanol, isopropanol, butanol, isobutanol, and isomers and mixtures of these alcohols. As previously indicated, it is ordinarily preferable to reduce the polyester in ethanol or isopropanol, particularly when the end use contemplated is as a flexographic ink vehicle. The total solvent content including the hydrocarbon solvent used to facilitate alcohol reduction of the polyester resins may be from 10 to 70% by weight of the total weight of the polyester resin solution, but is preferably from about 25 to 40% by weight.

The preferred total solvent system for the polyester resins is 5–15% high-flash V. M. and P. naphtha and 85–95% isopropanol.

When the polyester resins of the present invention are used as thermosetting coating compositions or as ink vehicles, they are first blended with one or more of a number of suitable aminoplast coreactive resins. Among the aminoplast resins which may be used are the urea formaldehyde, melamine formaldehyde, and triazine formaldehyde condensates along with their alkylated derivatives, which are prepared by alkylation of the aminoplasts with lower aliphatic alcohols such as methanol, ethanol, butanol, isobutanol, propanol, and the like. The amount of aminoplast which may be blended into the polyester resin varies over a wide range. The aminoplast resin may be used in amounts of up to 50% of the total resin composition by weight with the preferred range for more flexible substrate coatings falling in the range of from 5 to 30% by weight.

The amount of reducing solvent used with the polyester coating compositions of the present invention is generally determined by the viscosity requirements for the specific application to be made of the coating composition. A typical viscosity requirement is about 20″ No. 2 Zahn Cup at 25° C. and a non-volatile content of about 40%. This figure varies with the proportion and kind of the aminoplast resin which was used.

In order to obtain good cure performance in terms of time, an acidic catalyst or accelerator is commonly added to the thermosetting coating compositions formulated with aminoplast resins, and this practice is also helpful in effecting the cure of the coating compositions of this invention. A number of acidic catalysts or accelerators may be used with the coating compositions of the present invention, including phosphoric acid, various phosphate esters, citric acid, sulfuric acid, hydrochloric acid, and para toluene sulfonic acid. Para toluene sulfonic acid is generally the preferred catalyst but is unacceptable for use when the coating is to come into contact with food because of its highly extractable nature and current absence from lists of acceptable additives published by the Food and Drug Administration. The catalyst may be used in amounts up to 15 parts by weight per 100 parts by weight of aminoplast resin with about 5 parts by weight being the preferred level. Along with the catalyst or accelerator, a stabilizer is preferably also added to the coating composition to provide a proper balance between stability and cure performance. Various fugitive organic amines have been found to perform well as stabilizers. Among those which may be used are pyridine, morpholine, and butylamine, and generally any primary, secondary, or tertiary amine or alkanolamine, with pyridine being preferred because of its volatility. The organic amine may be used in amounts of from 10 to 100 parts per 100 parts of acid catalyst used. Ordinarily the addition of the catalyst or accelerator is made just prior to the time of use of the thermosetting coating because the catalyst promotes cross-linkage and gelling of the resinous materials resulting in a short pot life. The capacity of a thermosetting coating composition to retain its character prior to use is referred to as the pot life of the material. An additional advantage of the thermosetting coating compositions of the present invention is that they have long pot life after the catalyst or accelerator has been added. The instant thermosetting coating compositions have substantially retained their original character for periods of four months and longer; whereas, ordinary thermosetting coating compositions containing aminoplast resins have a pot life of at most a few days.

The alkyd resin containing thermosetting coating compositions of this invention may include a number of additional ingredients which provide the coating compositions with specialized features. Among these additional additives are waxes which reduce surface friction, antislip agents, flatting agents, dyes, pigments, and alcohol-soluble cellulosic resins which harden the coating after partial thermosetting has occurred.

The following examples are provided to further illustrate the present invention but should not be construed as limitative of the scope thereof.

Example I

A polyester resin of the present invention was prepared by charging a reaction vessel equipped with thermometer, stirrer, inert gas inlet and outlet, and reflux condenser with the following materials: 254 parts of phthalic anhydride, 171 parts of dimer acid comprising a trace of monomeric acid, 87% by weight dimeric acid, and 13% by weight trimeric acid, 27 parts by weight of tall oil fatty acids, 18 parts by weight of maleic anhydride and 95 parts by weight of propylene glycol representing 34% by weight of the total polyhydric alcohol used. The charge was heated with stirring to a temperature of about 150° C. and held at that temperature for one hour, after which 185 parts of glycerine were added and the temperature was increased to about 220° C. while the water of reaction was removed by nitrogen gas sparge. The reaction was continued until an acid value of 10 and a hydroxyl value of 227 were reached. The resin was then cooled to about 160° C. and 34 parts by weight high-flash V. M. and P. naphtha was slowly added. After the resulting polyester resin reaction product had been cooled to about 120° C., it was reduced with 303 parts of isopropyl alcohol which was slowly added thereto. The product had a viscosity of 950 centipoise and was completely soluble in the solvent and clear.

Example II

A polyester resin solution of this invention was prepared by placing in a reaction vessel equipped with thermometer, stirrer, inert gas inlet and outlet and reflux condenser, the following ingredients: 253 parts by weight of phthalic anhydride, 169 parts by weight of dimer acid having the same composition as in Example I, 15 parts by weight of pelargonic acid, 17 parts by weight of maleic anhydride, and 84 parts by weight of propylene glycol representing 34% by weight of the total weight of the polyhydric alcohol used. This charge was heated with stirring to a temperature of about 150° C. and the reaction was continued for one hour after which 163 parts by weight of glycerine were added and the temperature was increased to about 220° C. and heating continued while water of reaction was removed by nitrogen gas sparge until an acid value of 10 and a hydroxyl value of 249 were reached. The resulting resinous material was then cooled to about 160° C. and 34 parts of high-flash V. M. and P. naphtha were added. After further cooling to about 120° C., 306 parts of isopropyl alcohol were added. The product had a viscosity of 1000 centipoise and was completely soluble and clear.

Example III

A polyester resin was prepared by charging a suitable reaction vessel equipped with thermometer, stirrer, inert gas inlet and outlet and reflux condenser with the following reactant charge: 292 parts by weight of phthalic anhydride, 195 parts of dimer acid having a composition of Example I, 17 parts by weight of pelargonic acid, 20 parts by weight of maleic anhydride, 80 parts by weight of glycerine, and 148 parts by weight of propylene glycol constituting 65% by weight of the total amount of polyhydric alcohol used. The charge was heated with stirring to a temperature of about 220° C. while the water of reaction was removed by nitrogen gas sparge until an acid value of 10 was reached. The resulting resin had a hydroxyl value of 98. The resin was then cooled to about 160° C., and 34 parts by weight of high-flash V. M. and P. naphtha were slowly added. After the material contained within the reaction vessel had been cooled to about 120° C., 301 parts by weight of isopropyl alcohol were slowly added to reduce the polyester resin. The product had a viscosity of 6300 centipoise and was insoluble at a temperature of 25° C. or lower.

Example IV

A polyester resin of the present invention was prepared following the procedure of Example III with the exception that the reaction vessel was charged with 132 parts of phthalic anhydride, 148 parts of isophthalic acid, 177 parts by weight of dimer acid having the same composition as the dimer acid of Example I, 15 parts by weight of pelargonic acid, 18 parts by weight of maleic anhydride, 171 parts by weight of glycerine and 88 parts by weight of propylene glycol, representing 34% of the total amount of polyol used. After the reaction had proceeded to the point at which the acid value reached about 10 and a hydroxyl value of 240, the resin was cooled to 160° C., 33 parts of high-flash V. M. and P. naphtha were added. After the materials within the reaction vessel had been further cooled to about 120° C., 299 parts of isopropyl alcohol were added to reduce the polyester resin produced. The product had a viscosity of 340 centipoise and was completely soluble and clear.

Example V

A polyester resin solution of the present invention was prepared following the procedure of Example III with the following exception: the reaction vessel was initially charged with 270 parts by weight of phthalic anhydride, 180 parts of dimer acid having the composition of the dimer acid of Example I, 15 parts by weight of pelargonic acid, 18 parts by weight of maleic anhydride, 242 parts by weight of glycerine, and 25 parts by weight of propylene glycol representing 9% by weight of the total amount of polyol used. After the reaction had continued to the point that an acid value of 10 and a hydroxyl value of 265 had been reached, and the reaction mixture cooled to 160° C., 34 parts by weight of high-flash V. M. and P. naphtha were added and the mixture was then cooled to about 120° C. after which the resulting polyester resin was reduced by slowly adding 304 parts by weight of isopropyl alcohol. The product had a viscosity of about 3600 centipoise and was completely soluble and clear.

Example VI

An alkyd resin was prepared from the same ingredients and following the same procedure described in Example I. The reaction was continued until an acid value of 11 was reached at which point the resulting resin had a hydroxyl value of 244. After the resulting solution was cooled to 120° C., it was reduced with 3A ethanol to the point that the solution contained 67.5% solids. The ethanol reduced polyester resin was completely soluble and clear and at the reduction indicated had a viscosity of 275 centipoise.

Example VII

A polyester resin was prepared following the procedure of Example III with the following exceptions: the reaction vessel was initially charged with 370 parts by weight of phthalic anhydride, 150 parts of a dimer acid comprising 83% dimeric acid and 17% trimeric acid, 40 parts by weight of trimethylolethane, 77 parts by weight of propylene glycol, and 108 parts by weight of ethylene glycol, the glycol content being 82% of the total weight percentage of polyol used. After the reaction had been continued until an acid value of 10 was reached, at which point the resin had a hydroxyl value of 70, the reaction material was cooled to about 160° C. and 33 parts by weight of high-flash V. M. and P naphtha were added. When the resulting mixture had cooled to about 120° C., an attempt to reduce the polyester resin produced was made by slowly adding 298 parts by weight of isopropyl alcohol. The resulting polyester resin did not go into solution and was insoluble.

Example VIII

A polyester resin solution was prepared again following the procedure of Example III with the following exceptions: the reaction vessel was initially charged with 164 parts by weight of phthalic anhydride, 254 parts by weight of isophthalic acid, and 100 parts of the dimer acid of Example III, 35 parts by weight of trimethylolethane, 101 parts by weight of propylene glycol, and 96 parts by weight of ethylene glycol, the glycol content being 85% of the total weight percent of polyol used. After the reaction had continued until an acid value of 10 was reached, at which point the resin had a hydroxyl value of 60, 32 parts by weight of high-flash V. M. and P. naphtha were added and the resulting mixture was cooled to about 120° C., after which an attempt was made to reduce the polyester resin within the reaction vessel by the slow addition of 289 parts by weight of isopropyl alcohol. The polyester resin would not go into solution and was insoluble.

The results of the examples provided above clearly illustrate that alcohol-soluble alkyd resins may be prepared by proper control of the ingredients and method of preparation. Alcohol-soluble resin formulations and methods for preparing them are shown in Examples I, II, IV, V, and VI.

In contrast, Examples III, VII, and VIII demonstrate that when polyester resins are prepared using a polyol combination which produces polyester resins having hydroxyl values less than 100, an alcohol insoluble material is produced.

Example III is significant in that it shows the tendency of polyester resins to become alcohol insoluble when the diol content exceeds a certain point. Using 65% glycol based on the total amount of polyol, a polyester insoluble at ambient or lower temperatures is produced.

The following additional tests were conducted to illustrate the properties of coating compositions containing the alkyd resins of this invention.

Examples IX–XIII

Thermosetting coating compositions were prepared by adding to each of the alkyd resins of Examples I, II, IV, and VI, a butanol-ethanol solution of butylated-ethylated urea formaldehyde condensate resin sold commercially under the trade name Beckamine P-196-60. The urea-formaldehyde resin or aminoplast was added in the proportion of 70% alkyd resin solids to 30% aminoplast resin solids. The alkyd resin aminoplast resin mixtures were then reduced to a viscosity of about 20 seconds No. 2 Zahn Cup at 25° C. with isopropanol.

After the aminoplast resin had been blended into each of the alkyd resins of Examples I, II, IV, V, and VI, 5% by weight based on the weight of the aminoplast resin, of para toluene sulfonic acid was added along with 2.5% by weight, based on the total weight of the aminoplast resin, of pyridine. The resulting catalyzed coating compositions containing alcohol reduced alkyd resins, aminoplast resin, catalyst and stabilizer were each applied with a 6 R.D.S. wire-wound rod on a 10 mil, clay-coated bleached sulfate paperboard stock, and baked for 25 seconds in a forced-air convention oven at 135° C. Each of the coatings produced a fully cured, solvent and scratch resistant coating with high gloss, and virtually no residual odor.

Example XIV

The alkyd resin of Example II was mixed with a butanol-xylol solution of a butylated urea-formaldehyde condensate resin sold under the trade name Uformite F-200-E, in proportions such that, on a non-volatile basis, the resulting coating composition contained 70% solids of alkyd resin by weight to every 30% solids by weight of the aminoplast resin. To the resulting composition was added 5% by weight based on the weight of the aminoplast resin of para toluene sulfonic acid and 2.5% by weight based on the weight of the aminoplast resin of pyridine. The resultant catalyzed coating compositions were reduced to a viscosity of 43 seconds, No. 2 Zahn Cup at 25° C. with isopropanol and stored in a closed tin-plated steel friction lid can for three months at 25° C. The viscosity increased during this period to 49 seconds, No. 2 Zahn Cup at 25° C. The properties and the performance of the coating formulation were unaffected by the storage of the coating composition containing the catalyst, except for a slight loss of color equivalent to about 1 unit on the Gardner 1963 Scale. This result illustrates the excellent pot life of the polyester coating compositions of this invention.

Example XV

A pigmented flexographic coating composition containing a polyester resin of this invention was prepared in the following manner: the resin solution of Example I was pigmented by milling 300 grams of the solution and 300 grams of rutile grade titanium dioxide solid under the trademark Ti-Pure R-610 in a porcelain crock with porcelain balls. The crock was rolled until the constituents were fully dispersed. A pigmented flexographic coating or ink composition was prepared by combining 64 parts by weight of the above dispersed material, 11.2 parts by weight of Beckamine P-196-60, 19.0 parts of a solvent blend composed of 90 parts by weight isopropyl alcohol and 10 parts by weight high-flash V. M. and P. naphtha, 0.33 part by weight of para toluene sulfonic acid catalyst and 0.15 part by weight pyridine stabilizer.

For comparative purposes, a conventional thermoplastic system was prepared containing 35 parts Ti-Pure R-610 dispersed by the same procedure as described above into 25 parts of a dimer-based polyamide resin and 40 parts of n-propanol.

The thermosetting alkyd resin containing coating compositon prepared as described above was cured by baking in a forced-air conventional oven.

The resulting coating was glossy, tough and resisted attack by solvents including acetone, toluene and isopropyl alcohol. The coating showed excellent adherence properties when applied to clay-coated paperboard and to treated polyethylene film sold under the trademark Visqueen C.

The comparative thermoplastic coating after air drying produced a coating with higher gloss and equivalent adhesion properties to those of the alkyd resin based coating, but was substantially inferior in toughness (scratch resistance) and resistance to solvent attack. Baking the comparative thermoplastic coating did not improve its properties.

Obviously, many modifications and variations of this invention may be made without departing from the spirit and scope thereof and therefore only such limitations should be imposed as are indicated in the appended claims.

What we claim is:

1. A flexographic ink vehicle containing as an essential ingredient a polyester resin comprising the esterification reaction product of from 5–40 percent by weight, based on the total weight of the reactants of said polyester resin, of polymerized fatty acid, a dibasic acid compound selected from the group consisting of phthalic acid, phthalic anhydride, fumaric acid, maleic acid, and adipic acid, and at least two polydric alcohols, said polyhydric alcohols including a glycol in an amount of at least 10 percent by weight but not exceeding about 60 percent by weight of the total weight of said polyhydric alcohols, said polyester having a hydroxyl value of from about 100 to about 300.

2. An alkyd coating composition comprising (a) an alkyd resin prepared from the esterification reaction of from 5 to 40% by weight based on the total weight of the reactants of said alkyd resin, of a dimer acid, a compound selected from the group consisting of phthalic acid and its derivatives, and at least two polyhydric alcohols, said polyhydric alcohols having a glycol content of from 10% by weight to not more than about 60% by weight of the total weight of said polyhydric alcohols, said alkyd resin having a hydroxyl value of from 100 to 300 and (b) an aminoplast resin.

3. The coating composition of claim 2 wherein said aminoplast resin is an alkylated urea-formaldehyde resin.

4. The coating composition of claim 3 wherein said aminoplast resin is present in an amount of from 5% by weight to 100% by weight based on the weight of said alkyd resins.

5. The composition of claim 4 and further including an accelerator.

6. The composition of claim 5 wherein said accelerator is an acidic catalyst.

7. The composition of claim 6 and further including as a stabilizer an organic amine.

8. The composition of claim 6 wherein said accelerator is para toluene sulfonic acid.

9. An alcoholic solution of the composition of claim 8.

10. An alcoholic solution of the composition of claim 4.

11. The composition of claim 10 wherein the solvent of said solution is a mixture of from 50 to 100% by weight of an alcohol selected from the group consisting of ethanol, normal propanol, and isopropanol and from 0 to 50% by weight of a hydrocarbon solvent.

12. A substrate supporting the composition of claim 2.

References Cited

UNITED STATES PATENTS 3,349,049   10/1967   Seiwert et al. _____ 260—22

DONALD E. CZAJA, Primary Examiner

R. W. GRIFFIN, Assistant Examiner

U.S. Cl. X.R.

106—27, 243, 267; 117—138.8, 155, 161; 260—22, 33.4, 33.6, 45.9